United States Patent
Van Phan et al.

(10) Patent No.: US 9,749,856 B2
(45) Date of Patent: Aug. 29, 2017

(54) DEVICE TO MACHINE COMMUNICATIONS

(75) Inventors: Vinh Van Phan, Oulu (FI); Ling Yu, Oulu (FI); Kari Veikko Horneman, Oulu (FI)

(73) Assignee: Nokia Solutions and Networks OY, Espoo (FI)

( * ) Notice: Subject to any disclaimer, the term of this patent is extended or adjusted under 35 U.S.C. 154(b) by 0 days.

(21) Appl. No.: 14/409,767

(22) PCT Filed: Jun. 20, 2012

(86) PCT No.: PCT/EP2012/061850
§ 371 (c)(1),
(2), (4) Date: Dec. 19, 2014

(87) PCT Pub. No.: WO2013/189533
PCT Pub. Date: Dec. 27, 2013

(65) Prior Publication Data
US 2015/0327063 A1    Nov. 12, 2015

(51) Int. Cl.
*H04W 12/06* (2009.01)
*H04W 4/00* (2009.01)
(Continued)

(52) U.S. Cl.
CPC ........... *H04W 12/06* (2013.01); *H04W 4/005* (2013.01); *H04W 4/008* (2013.01); *H04W 12/04* (2013.01); *H04W 12/08* (2013.01); *H04W 88/02* (2013.01)

(58) Field of Classification Search
CPC ..... H04W 12/04; H04W 12/06; H04W 12/08; H04W 4/005; H04W 4/008; H04W 88/02; H04W 4/02; H04W 76/023
See application file for complete search history.

(56) References Cited

U.S. PATENT DOCUMENTS

2012/0015607 A1* 1/2012 Koskela .............. H04W 76/023
455/62
2012/0127906 A1* 5/2012 Evans .................. H04W 4/005
370/312

(Continued)

FOREIGN PATENT DOCUMENTS

EP    1492302 A2    12/2004
EP    2393266 A1    12/2011
(Continued)

OTHER PUBLICATIONS

International Search Report and Written Opinion for International Application No. PCT/EP2012/061850, mailed Apr. 25, 2013, 13 pages.

(Continued)

*Primary Examiner* — Nam Huynh
(74) *Attorney, Agent, or Firm* — Brake Hughes Bellermann LLP

(57) ABSTRACT

Methods and apparatuses for providing services for a mobile device with access to a cellular system are disclosed. In accordance with a method a mobile device sends to a cellular system a request for a service by a machine type device. The request includes information identifying the machine type device for use by the cellular system that is then used in exchange of information in relation to at least one of authentication, authorization and configuration. Information associated with configuration of a device-to-machine connection to the machine type device is then sent to the mobile device. The device-to-machine connection for use of the service is then established between the machine type device and the mobile device based on the received information. In another embodiment the mobile device contact the machine type device first and provides the machine type device with information assigned by the cellular system.

22 Claims, 6 Drawing Sheets

(51) Int. Cl.
*H04W 12/04* (2009.01)
*H04W 12/08* (2009.01)
*H04W 88/02* (2009.01)

(56) References Cited

U.S. PATENT DOCUMENTS

2013/0042011 A1\* 2/2013 Sugizaki ............... H04W 4/005
  709/227
2013/0336206 A1\* 12/2013 Farhadi ................. H04W 4/005
  370/328

FOREIGN PATENT DOCUMENTS

| JP | 2005-323070 A | 11/2005 |
| JP | 2008-172614 A | 7/2008 |

OTHER PUBLICATIONS

Crow, Brian P. et al, "IEEE 802.11 Wireless Local Area Networks", IEEE Communications Magazine, Sep. 1997, pp. 116-126.

\* cited by examiner

DEVICE TO MACHINE COMMUNICATIONS

This application is a national stage entry of PCT Application No. PCT/EP2012/061850, filed on Jun. 20, 2012, entitled "DEVICE TO MACHINE COMMUNICATIONS", which is hereby incorporated by reference in its entirety.

This disclosure relates to wireless communications and more particularly to device to machine communications.

Generally, communication sessions on wireless carriers can be provided between two or more nodes such as fixed or mobile devices capable of wireless communications, access nodes such as base stations, servers, machine type terminals and so on. A communication system and compatible communicating entities typically operate in accordance with a given standard or specification which sets out what the various entities associated with the system are permitted to do and how that should be achieved. For example, the standards, specifications and related protocols can define the manner how various nodes shall communicate, how various aspects of the communications such as access and security shall be implemented and how the communicating nodes shall be configured.

Wireless systems can be divided in coverage areas typically referred to as cells, hence the name cellular system. A cell can be provided by a base station, there being various different types of base stations. A base station system may provide a plurality of cells. Different types of cells can provide different features. For example, cells can have different shapes, sizes and other characteristics. Other examples of wireless systems include different wireless local networks, for example wireless local area networks (WLAN).

A user can access a communication system by means of an appropriate communication device. A communication device of a user is often referred to as user equipment (UE) or terminal. A communication device is provided with an appropriate signal receiving and transmitting arrangement for enabling communications with other parties. In wireless systems a communication device provides a transceiver station that can communicate over an air interface. The communication device may access carriers provided by nodes such as base stations, other communications devices and so on, and transmit and/or receive communications on the carriers. A node may communicate simultaneously on a plurality of carriers. A mobile device subscribing to a cellular system is typically provided with an identity module. This is commonly known as the Subscriber Identity Module (SIM).

Machine type communications (M-communications) is one of recent development in the field of wireless applications. Machine applications (M-applications) can be used for many purposes. For example, M-applications may be provided for use in smart homes, smart metering, fleet management, remote healthcare, access network operation management and so on.

A subfield in this area is known as Device-to-Machine (D2M) communications that is provided under assistance of a cellular network. A use case of cellular network assisted M-communications is where a machine type device (M-device) provides services for a cellular or any other authentic wireless device in the proximity of a machine type device. A non-limiting example of a machine type device is a SIM-less machine. The services are provided over a specified device to machine (D2M) radio interface, preferably in an effective and secure manner. The machine type device may comprise any device capable of providing wireless communications for a purpose, for example a printer, location information service station, play or download station and so on.

Current use cases of cellular network assisted M-communications often consider a mobile device acting as a service provider to a machine type terminal device. That is, in the current scenarios a mobile device provides access point and gateway functionalities to a machine type device.

The inventors have found that could be desirable for a machine type device to be able to serve as an access points for a mobile device. There are, however, unresolved issues in view of for example reliable authentication and/or authorisation and well as configuration of parties to the communications.

It is noted that the above discussed issues are not limited to any particular communication environment, but may occur in any appropriate communication system.

Embodiments of the invention aim to address one or several of the above issues.

According to an aspect, there is provided a method for providing a service for a mobile device with access to a cellular system, comprising sending to the cellular system a request for a service by a machine type device, the request including information identifying the machine type device for use by the cellular system in exchange of information in relation to at least one of authentication, authorisation and configuration, receiving from the cellular system information associated with configuration of a device-to-machine connection to the machine type device, and establishing the device-to-machine connection for use of the service by the machine type device based on the received information.

According to an aspect, there is provided an apparatus for enabling use of services, the apparatus comprising at least one processor, and at least one memory including computer program code, wherein the at least one memory and the computer program code are configured, with the at least one processor, to cause sending to a cellular system a request for a service by a machine type device, the request including information identifying the machine type device for use by the cellular system in exchange of information in relation to at least one of authentication, authorisation and configuration, process information received from the cellular system, the information being associated with configuration of a device-to-machine connection to the machine type device, and to establish the device-to-machine connection for use of the service by the machine type device based on the received information.

According to an aspect, there is provided a method for providing a service for a mobile device with access to a cellular system, comprising receiving from the mobile device a request for a service provided by a machine type device, the request including information identifying the machine type device, exchanging, based on the information identifying the machine type device, information with an entity associated with the machine type device in relation to at least one of authentication, authorisation and configuration, and sending to the mobile device information associated with configuration of a device-to-machine connection with the machine type device for enabling use of the service.

According to an aspect, there is provided an apparatus for enabling use of services, the apparatus comprising at least one processor, and at least one memory including computer program code, wherein the at least one memory and the computer program code are configured, with the at least one processor, to receive from a mobile device a request for a service provided by a machine type device, the request including information identifying the machine type device, exchange, based on the information identifying the machine type device, information with an entity associated with the machine type device in relation to at least one of authentication, authorisation and configuration, and cause sending to the mobile device information associated with configuration of a device-to-machine connection with the machine type device for enabling use of the service.

According to an aspect, there is provided a method for providing a service for a mobile device with access to a cellular system, comprising receiving from the cellular system a message including information identifying a machine type device providing the service, the message being triggered by a request from the mobile device for the service, in response to the message, exchanging information with the cellular system in relation to at least one of authentication, authorisation and configuration of the mobile device and/or the machine type terminal, and allowing the mobile device to connect with the machine type device based on the exchange of information.

According to an aspect, there is provided an apparatus for enabling use of services, the apparatus comprising at least one processor, and at least one memory including computer program code, wherein the at least one memory and the computer program code are configured, with the at least one processor, to receive from a cellular system a message including information identifying a machine type device providing a service, the message being triggered by a request from the mobile device for the service, in response to the message, exchange information with the cellular system in relation to at least one of authentication, authorisation and configuration of the mobile device and/or the machine type terminal, and allow the mobile device to connect with the machine type device based on the exchange of information.

According to an aspect, there is provided a method for providing a service for a mobile device subscribing to a cellular system, comprising handling a machine type device providing the service as an access point available for selection for the mobile device and selecting the machine type device for a device-to-machine connection based on information available for the mobile device, sending information associated with the cellular system to the machine type device for use in authentication and/or authorisation of the mobile device between an entity associated with the machine type device and the cellular system, accessing the cellular system by the mobile device, and accessing the service via the device-to-machine connection when connected to the cellular system.

According to an aspect, there is provided an apparatus for enabling use of services, the apparatus comprising at least one processor, and at least one memory including computer program code, wherein the at least one memory and the computer program code are configured, with the at least one processor, to handle a machine type device providing a service as an access point available for selection for a mobile device and select the machine type device for a device-to-machine connection based on information available for the mobile device, cause sending of information associated with a cellular system to the machine type device for use in authentication and/or authorisation of the mobile device between an entity associated with the machine type device and the cellular system, cause access to the cellular system by the mobile device, and cause access to the service via the device-to-machine connection when the mobile device is connected to the cellular system.

According to an aspect, there is provided a method for providing a service for a mobile device subscribing to a cellular system, comprising receiving from the mobile device a request for a service provided by machine type device, the request including information of an identity of the mobile device assigned by the cellular system, contacting the cellular system to authenticate and/or authorise the mobile device, the contacting causing the mobile device to have an access facility to the cellular system, receiving authentication and/or authorisation from the cellular system, and enabling communications for the mobile device via a device-to-machine connection when the mobile device is connected to the cellular system.

According to an aspect, there is provided an apparatus for enabling use of services, the apparatus comprising at least one processor, and at least one memory including computer program code, wherein the at least one memory and the computer program code are configured, with the at least one processor, to receive from a mobile device a request for a service provided by a machine type device, the request including information of an identity of the mobile device assigned by a cellular system, contact the cellular system to authenticate and/or authorise the mobile device, the contacting causing the mobile device to have an access facility to the cellular system, receive authentication and/or authorisation from the cellular system, and enable communications for the mobile device via a device-to-machine connection when the mobile device is connected to the cellular system.

According to an aspect, there is provided a method in a cellular system, comprising receiving a request to authenticate and/or authorise a mobile device subscribing to the cellular system for use of a service by a machine type device from an entity associated with the machine type device, the request including information of an identity of the mobile device assigned by the cellular system, causing the mobile device to have an access facility to the cellular system, sending authentication and/or authorisation to the requesting entity, and maintaining the access facility for the mobile device in the cellular system at least for a part of the duration of service usage by the mobile device via a device-to-machine connection.

According to an aspect, there is provided an apparatus for enabling use of services, the apparatus comprising at least one processor, and at least one memory including computer program code, wherein the at least one memory and the computer program code are configured, with the at least one processor, to receive a request to authenticate and/or authorise a mobile device subscribing to a cellular system for use of a service by a machine type device from an entity associated with the machine type device, the request including information of an identity of the mobile device assigned by the cellular system, cause the mobile device to have an access facility to the cellular system, cause sending of authentication and/or authorisation information to the requesting entity, and maintain the access facility for the mobile device in the cellular system at least for a part of the duration of service usage by the mobile device via a device-to-machine connection.

In accordance with a more detailed aspect information identifying the machine type device comprises a unique number or address of the machine type device.

The access facility for the mobile device can be maintained for at least the duration of use of the service.

The mobile device may be maintained in a radio resource control idle state where context information is maintained in the cellular system or radio resource control connected state with advance discontinuous reception while the mobile device communicates via the device-to-machine connection.

The mobile device may detect a machine type device and/or a service by a machine type device.

A radio resource control connection or scheduling request may be communicated to the cellular system via the device-to-machine connection.

Information regarding dedicated resources allocated by the cellular system may be communicated via the device-to-machine connection to the mobile device. The information may comprise at least one of a dedicated random access channel (RACH) preamble, a new C-RNTI, timing advance, and a bearer service configuration.

Data may be communicated to the cellular system via the device-to-machine connection from the mobile device. The mobile device may be in radio resource control idle state.

A part of information for accessing the machine type device may be provided by the cellular system and a second part of the information for accessing the machine type device may be provided by the machine type device.

The mobile device may report information relating to the device-to-machine connection.

Information regarding the status and/or termination of the device-to-machine connection may be communicated.

Information of the machine type device may be provided by means of at least one of an air interface between the machine type device and the mobile device, an air interface between a station of the cellular system and the mobile device, and an advertisement visible at the location of the machine type device.

Data associated with the mobile device may be deleted from the machine type device and/or an entity serving the machine type device in response to termination of the device-to-machine connection.

A machine type device may be arranged to serve only those mobile devices that are capable of camping in predefined one or more cells of the cellular system.

The mobile device may determine whether to request for the service from a machine type device or from a cellular network.

A node for a cellular network such as network controller, a mobile station, a machine type device or a separate entity controlling a machine type device can be configured to operate in accordance with the various embodiments.

A computer program comprising program code means adapted to perform the method may also be provided.

It should be appreciated that any feature of any aspect may be combined with any other feature of any other aspect.

Embodiments will now be described in further detail, by way of example only, with reference to the following examples and accompanying drawings, in which.

In the following certain exemplifying embodiments are explained with reference to a wireless or mobile communication systems capable of serving mobile communication devices. Before explaining in detail the exemplifying embodiments, certain general principles of a wireless communication system, access systems thereof, and mobile communication devices are briefly explained with reference to FIGS. 1 and 2 to assist in understanding the described examples.

Figure 1:
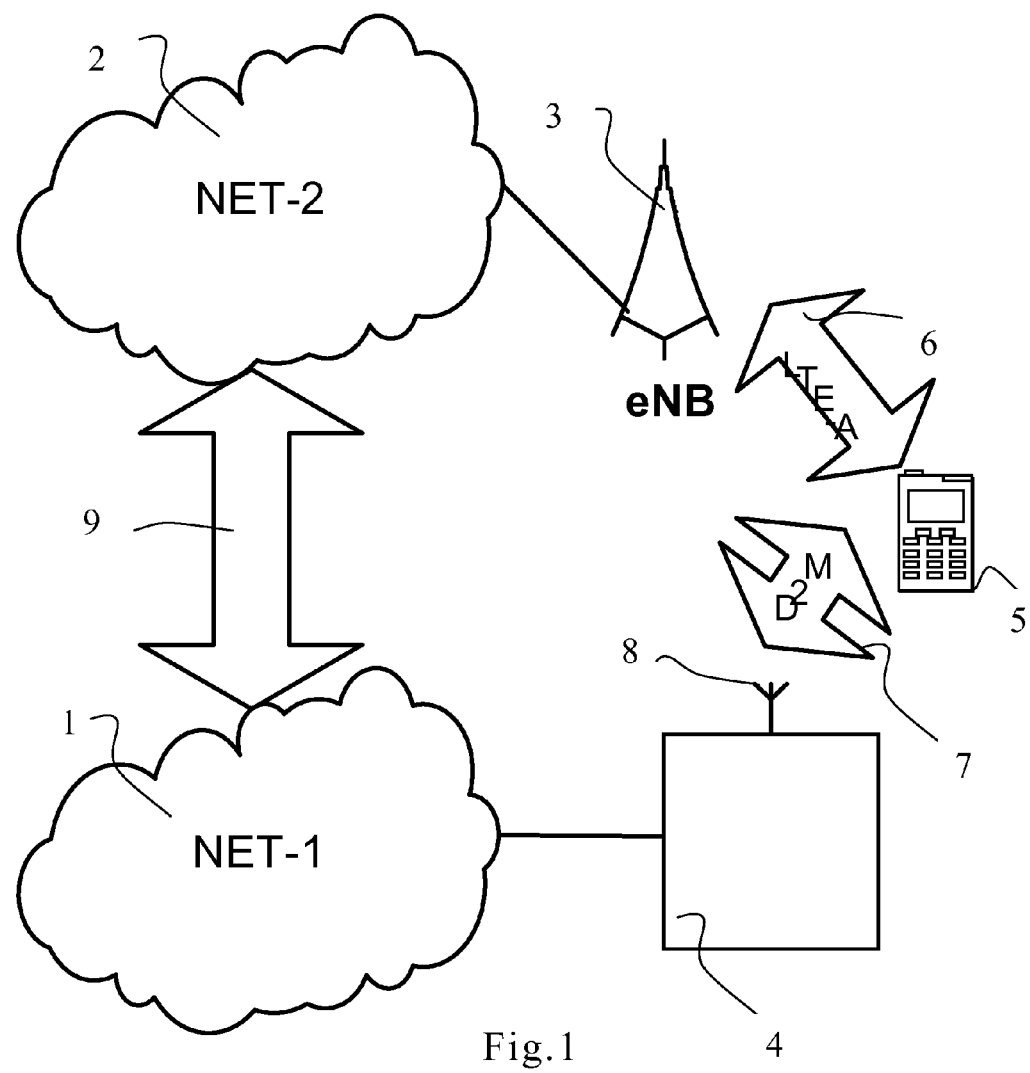
FIG. 1 shows a schematic diagram of a communication system where the invention can be embodied.

A communication device 5 can be provided wireless access via at least one base station or similar wireless transmitter and/or receiver node of a cellular access system. In FIG. 1 base station 3 provides a radio service area of a cellular system 2 serving the mobile communication device via connection 6. Each communication device and base station may have one or more radio channels open at the same time and may send signals to and/or receive signals from more than one source.

Base stations are typically controlled by at least one appropriate controller apparatus so as to enable operation thereof and management of mobile communication devices in communication with the base stations. The control apparatus can be interconnected with other control entities. The control apparatus can typically be provided with memory capacity and at least one data processor. The control apparatus and functions may be distributed between a plurality of control units. In some embodiments, each base station can comprise a control apparatus. In alternative embodiments, two or more base stations may share a control apparatus. In some embodiments at least a part of control apparatus may be respectively provided in each base station.

A non-limiting example of the recent developments in cellular communication system architectures is the long-term evolution (LTE) of the Universal Mobile Telecommunications System (UMTS) that is being standardized by the 3rd Generation Partnership Project (3GPP). A further development of the LTE is referred to as LTE-Advanced. The LTE employs a mobile architecture known as the Evolved Universal Terrestrial Radio Access Network (E-UTRAN). Base stations or base station systems of such architectures are known as evolved or enhanced Node Bs (eNBs). An eNB may provide E-UTRAN features for cells such as user plane Radio Link Control/Medium Access Control/Physical layer protocols (RLC/MAC/PHY) and control plane Radio Resource Control (RRC) protocol terminations towards the communication devices.

In FIG. 1 another communication system offering communication facility for at least one machine type device is denoted by reference 1. A machine type device (M-device) 4 capable of providing machine type communications (M-communications) for the mobile device 5 via a device-to-machine (D2M) connection 7. The machine type device 4 provides at least one service in the proximity of the device. In accordance with an example the machine type device is a printer. The printer is connected to its server located somewhere in a network, for example in the Internet. The connection can be based on a regular fixed Internet Protocol (IP) access digital subscriber line (DSL). In accordance with an embodiment system 1 can be understood as one not providing a regular wireless access network and M-device as a device that is not a base station but a machine type device arranged to provide certain services. The radio access for end-user (e.g. cellular UE) is via direct D2M communications with the M-device on link 7. M-device may be provided by a third party machine service provider. In a simple form system 1 can be just an Internet server. The machine type device can be provided with an appropriate antenna arrangement 8, depending on the application, for enabling the wireless link 7.

Communication system 1 can be based on any appropriate technology. Examples of possible radio access technologies for the other system include those provided by base stations of systems that are based on technologies such as wireless local area network (WLAN) and/or WiMax (Worldwide Interoperability for Microwave Access), WiFi, IEEE 802.11 direct mode or an interface that may be designed and specified for direct D2D/D2M communications in 3GPP LTE-A Release 12 and beyond. Other systems such as those operating on non-licenced bands are known and could be used for this purpose.

A possible mobile communication device for the above communications is often referred to as user equipment (UE) or terminal. An appropriate mobile communication device may be provided by any device capable of sending radio signals to and/or receiving radio signals. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information.

The mobile device may communicate signals with stations over an air interface via appropriate apparatus for receiving and transmitting radio signals. The signals may be communicated with cellular system and directly via device-to-device (D2D) or device-to-machine (D2M) links.

Figure 2:
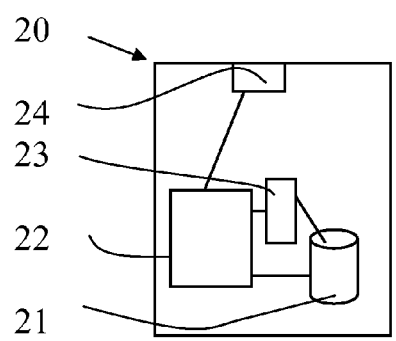
FIG. 2 shows a schematic diagrams of a control apparatus.

Mobile devices, base stations. machine type devices and other communicating devices are typically controlled by at least one appropriate controller apparatus so as to enable operation thereof and control of wireless communications. The control apparatus can be interconnected with other control entities. FIG. 2 shows an example of a control apparatus 20 capable of operating in accordance with the embodiments, for example to be coupled to and/or for controlling any of devices involved in the embodiments described below. The control apparatus can be configured to provide control functions in association with service discovery, sending, receiving, determining and generating various information, generation and communication of messages between the various entities and/or control functions based on such information by means of the data processing facility in accordance with the certain embodiments described above. For this purpose the control apparatus comprises at least one memory 21, at least one data processing unit 22, 23 and an input/output interface 24. The control apparatus can be coupled to a receiver and/or transmitter of the relevant node via the interface. The control apparatus can be configured to execute an appropriate software code to provide the control functions. The control apparatus and functions may be distributed between a plurality of control units.

The required data processing apparatus and functions may be provided by means of one or more data processors. The described functions may be provided by separate processors or by an integrated processor. The data processors may be of any type suitable to the local technical environment, and may include one or more of general purpose computers, special purpose computers, microprocessors, digital signal processors (DSPs), application specific integrated circuits (ASIC), gate level circuits and processors based on multi core processor architecture, as non-limiting examples. The data processing may be distributed across several data processing modules. A data processor may be provided by means of, for example, at least one chip. Appropriate memory capacity can also be provided in the relevant devices. The memory or memories may be of any type suitable to the local technical environment and may be implemented using any suitable data storage technology, such as semiconductor based memory devices, magnetic memory devices and systems, optical memory devices and systems, fixed memory and removable memory.

In accordance with embodiments arrangements comprising networking functions and procedures to facilitate secure cellular network assisted D2M communications are provided.

Figure 3:
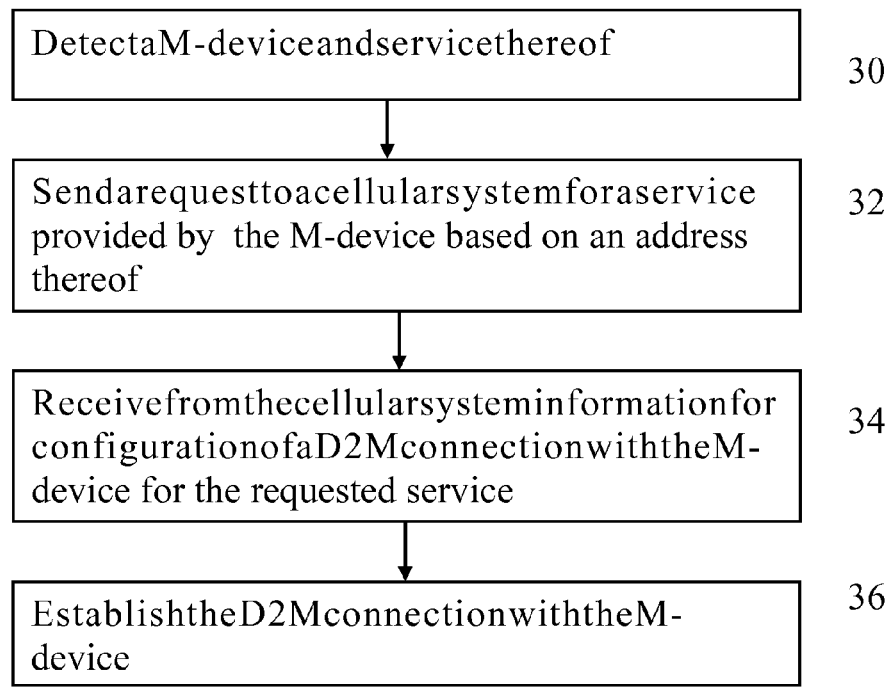
FIGS. 3 to 8 shows schematic flowcharts according to certain embodiments.

FIG. 3 shows a method operated at a mobile device with access to a cellular system for providing a service for the mobile device. In the method a device-to-machine connection is established for acquiring a service provided by a machine type device. The machine type device may not be directly connect to the cellular system but is associated with another system. For example, the machine type device can be connected to a server and/or a local area network. A service provided by the machine type device and/ore a machine type device may be detected at 30. The mobile device sends at 32 to the cellular system a request for a service provided by the machine type device based on information identifying the machine type device (M-device). The request includes information identifying the M-device for use by the cellular system for configuring the mobile device and/or for exchange of information with the other system. Signalling by a control apparatus of the cellular system can comprise signalling of information in relation to at least one of authentication, authorisation and configuration. The mobile device then receives at 34 from the cellular system information associated with configuration of the device-to-machine connection to the machine type device so as to enable use of the service. The device-to-machine connection can then be established at 36 with the machine type device based on the received information.

Detection of the M-device and a service thereof may be based, for example, on some limited and/or basic information made available for the user of the mobile device. For example, the information may be displayed on or in the vicinity of the M-device. According to a possibility M-device transmits information regarding itself over an air interface using D2M discovery. The mobile device may not discover or know at this stage whether a connection that is needed for a requested service is provided by means of the cellular system and via direct D2M or via a regular cellular access. This can be left for the serving cellular system to decide. After a decision making procedure the mobile device can be configured accordingly.

The M-device does not necessarily need to broadcast all access information in non-ciphered format for any device to see. Instead, only authenticated and authorized devices which initially access the cellular system and are subsequently configured with certain information how to access the M-device via a direct D2M may be provided with full set of information. Thus, the task of providing information for enabling access to the M-device can be divided between the cellular system and the M-device to facilitating secure and efficient D2M connection for acquiring a requested service.

In accordance with an embodiment, to keep down the signalling overhead for the serving cellular system, only essential information is provided by the cellular system. This information can relate to security, identity, charging and some other essential/differentiated aspect of access.

The mobile device may not need to be able to detect any association of the M-device with the second network. Aspects of this may be left for the serving cellular system.

Figure 4:
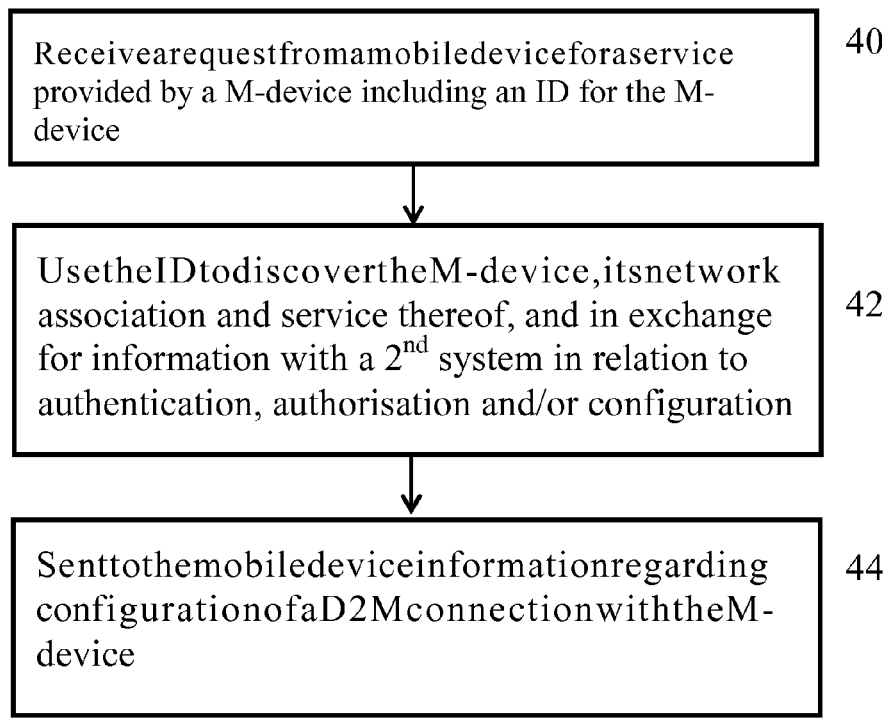

FIG. 4 shows the operation as provided in a control apparatus provided at the cellular system for a method enabling a mobile device to request for a service from a M-device and where a D2M connection is provided for acquiring the requested service instead of using e.g. a regular cellular access. At 40 a request for a service offered by a machine type device is received from the mobile device. The request includes information identifying the machine type device. Said identifying information is then used at 42 for exchange of information with an entity in another system in relation to at least one of authentication, authorisation and configuration. Information associated with configuration of the device-to-machine connection with the machine type device is sent at 44 to the mobile device for use in configuring the mobile device.

The cellular system may need to discover the M-device, its association to the other system, and the service(s) is provides based on the received identity information before being able to exchange information with the other system for setting up the D2M connection for the requested service.

Figure 5:
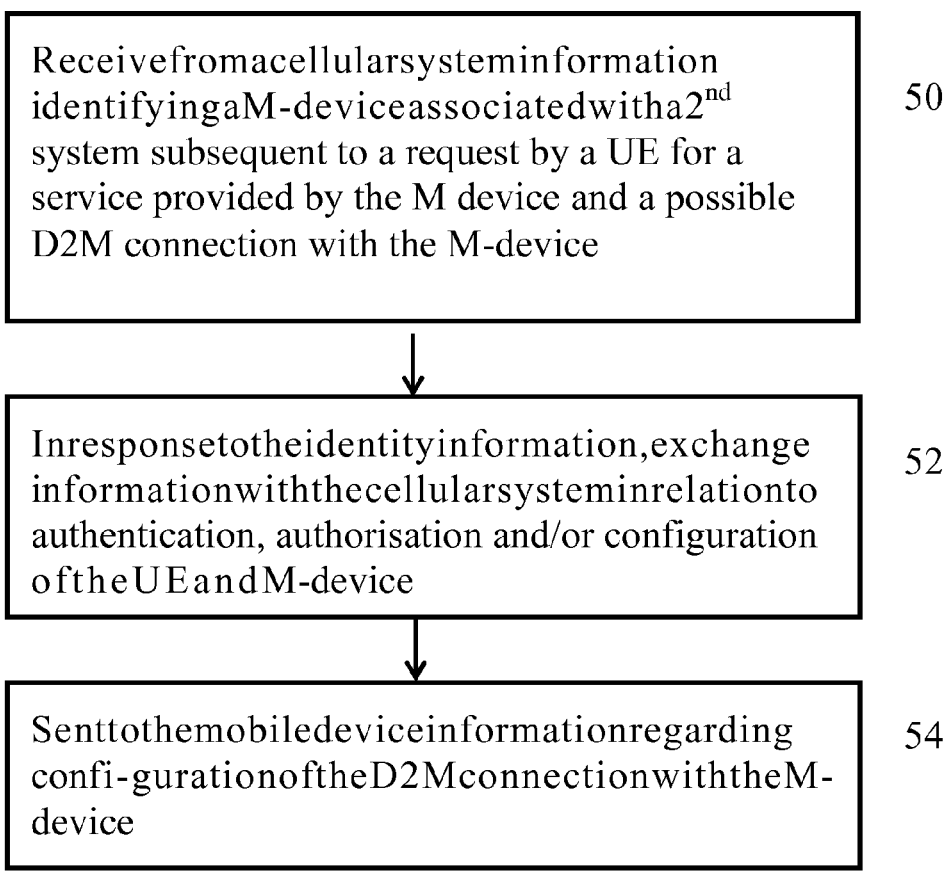

FIG. 5 shows the operation taking place in a system associated with the machine type device for establishing a device-to-machine connection for a cellular mobile device that has requested for a service provided by a machine type device. A message including information identifying the machine type device is received at 50 from the cellular system. The message is triggered by a request for the service from the mobile device. In response to the message, information is exchanged at 52 with the cellular system in relation to at least one of authentication, authorisation and configuration of the mobile device and/or the machine type terminal. The mobile device is then allowed to connect at 54 with the machine type device based on the exchange of information. This operation may be controlled by any apparatus associated with the M-device, for example by a server connected to the M-device.

Figure 6:
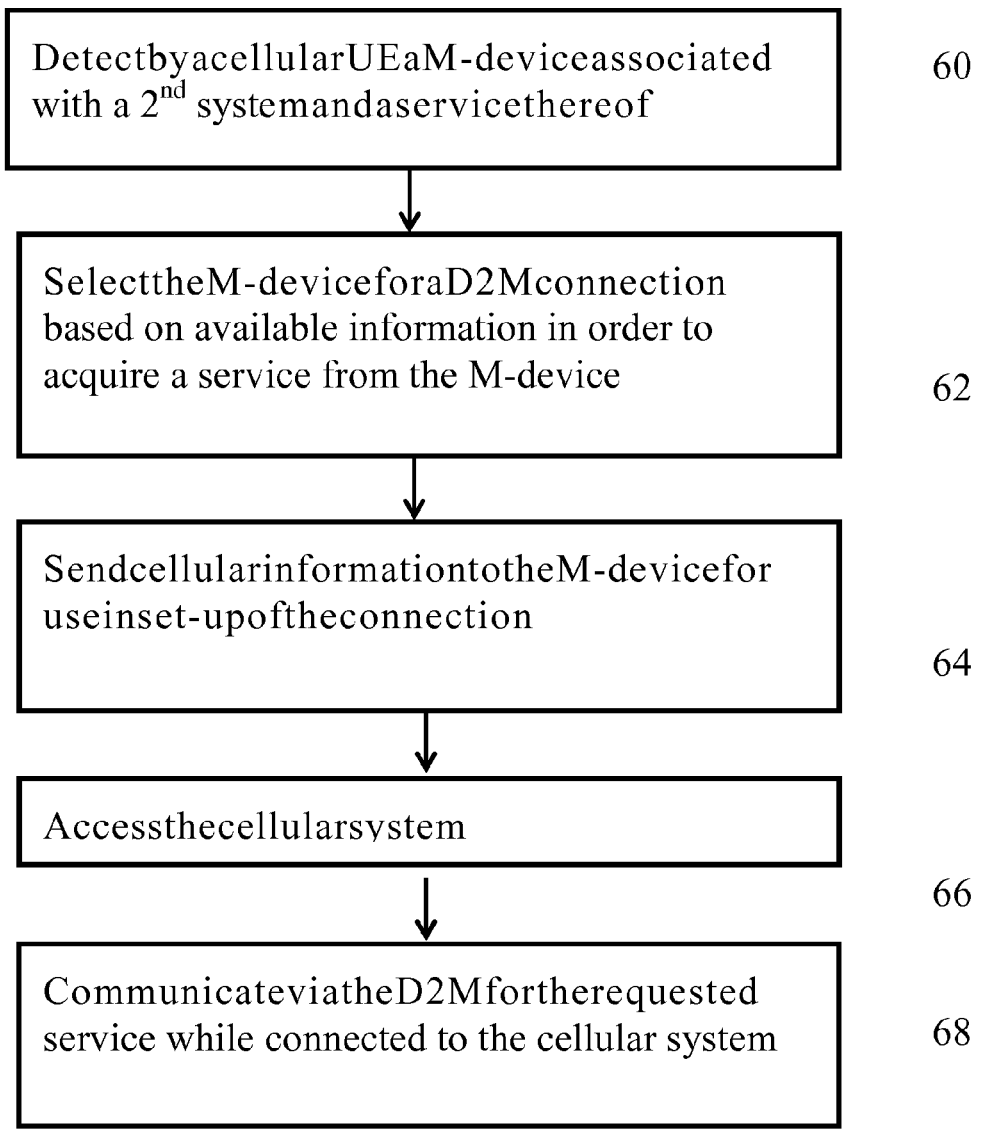

FIG. 6 shows a different method for providing a service to a mobile device subscribing to a cellular system. The mobile device detects at 60 a machine type device and/or the service. The machine type device can be handled as an access point available for selection. Thus the mobile device can select the machine type device at 62 for a device-to-machine connection to acquire the service based on information of the machine type device available for the mobile device. Information associated with the cellular system is then sent at 64 to the machine type device for use in authentication and/or authorisation of the mobile device between the second communication system and the cellular system. The cellular system is accessed by the mobile device at 66. Once the access facility is in place, the mobile device communicates for the purposes of using the service via a device-to-machine connection at 68 while also staying connected to the cellular system.

Figure 7:
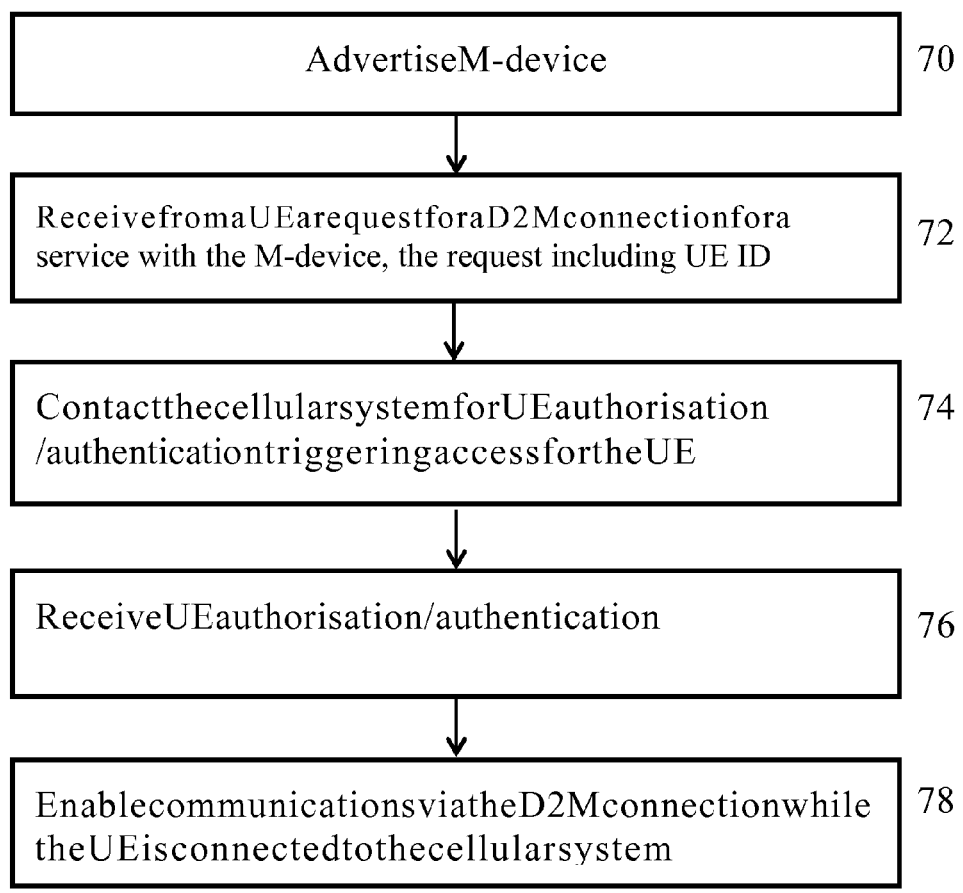

FIG. 7 illustrates a possible operation from the point of view of a system associated with the machine type device and/or the machine type device. The machine type device and/or services thereof is advertised at 70 to mobile devices subscribing to a cellular system. At 72 a request for a service provided by the machine type device is received from the mobile device. The request includes information of an identity of the mobile device as assigned by the cellular system. The cellular system is then contacted at 74 to authenticate and/or authorise the mobile device. The contacting causes the mobile device to have an access facility to the cellular system. Authentication and/or authorisation is received at 76 from the cellular system, and communications in association with the requested service are subsequently enabled at 78 for the mobile device via a device-to-machine connection while the mobile device is connected to the cellular system.

Figure 8:
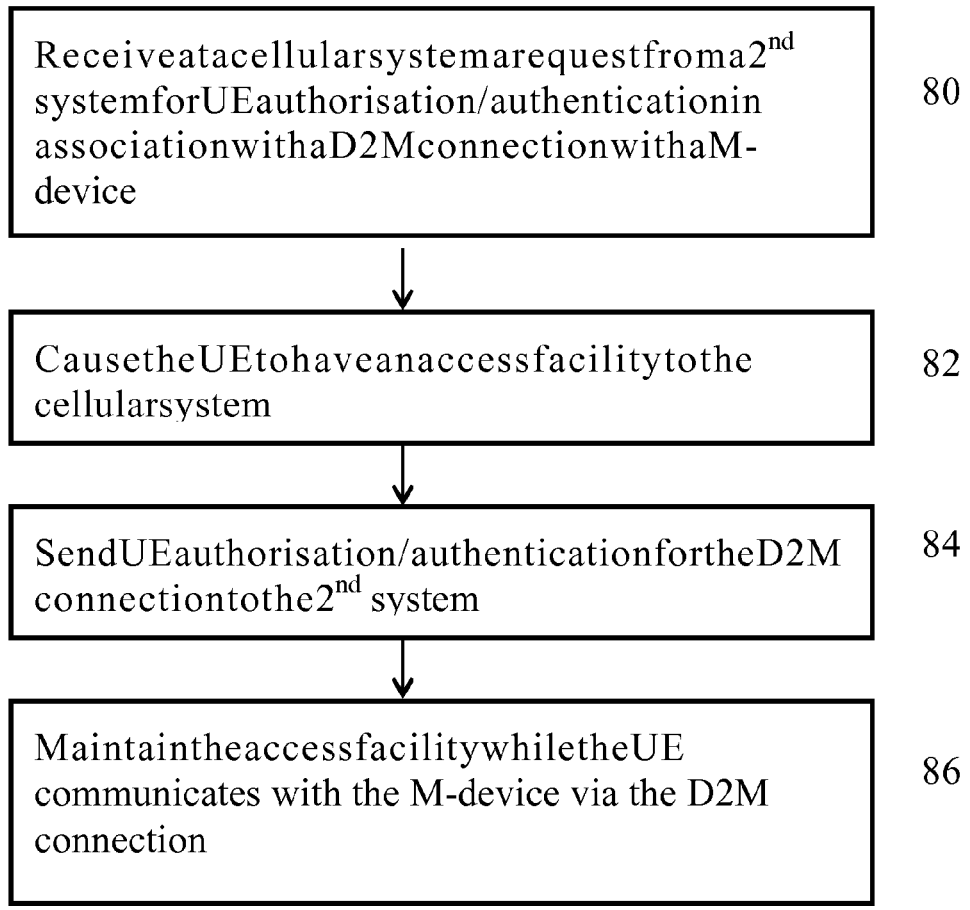

FIG. 8 shows this operation from the point of view of the cellular system. A request to authenticate and/or authorise a mobile device subscribing to the cellular system for a use of a service provided by a machine type device is received at 80 from the system connected to the machine type device. The request includes information of an identity of the mobile device as assigned by the cellular system. The request causes the mobile device to have an access facility at 82 to the cellular system. At this stage a new access facility can be provided. According to another possibility it is at least ensured that there is an existing access facility that can be used by the mobile device, if needed. Authentication and/or authorisation is then sent at 84 to the system serving the machine type device. The access facility is maintained at 86 for the mobile device in the cellular system while the mobile device communicates for the purposes of using the service via a device-to-machine connection.

Exemplifying more detailed scenarios for the above embodiments are now described with reference to FIG. 1. A M-device or a machine server 4 of a first authentic network 1 provides services for a capable mobile device 5 of a second authentic or cellular network 2 over a specified D2M air interface 7. The first network 1 and the second network 2 are interconnected via link 8 for designated internetworking and cooperation. The mobile device 5 can be configured to discover the machine server 4 and initiate service request to the machine server directly or via the serving cellular network/2.

The machine server 4 can be configured to advertise itself over the D2M interface 7. In an advertisement the machine server 4 may broadcast information such as its identity, system information, service information, and/or access information to inform potential mobile devices of its existence.

The machine server 4 may also broadcast barring information to prevent unsuitable devices from selecting and attempting to connect to it for requesting a service. For example, mobile devices subscribing to an unsupported cellular mobile operator or using untrusted prepaid subscriber identity module (SIM) or mobile numbers or having incompatible capability, etc., may be prevented by means of barring information from selecting a particular machine server.

In a cellular network controlled D2M arrangement a mobile device can be supposed to be an authentic mobile user of a cellular network that provides service coverage over the area where a relevant machine server is placed or located. The mobile device can also be provided with the capability to connect to the cellular network in order to conduct D2M communications for the requested service. In an embodiment, the machine server may be configured to serve only mobile devices which are able to camp in and connect to a certain local cell(s) of a cellular network(s) seen or detected by the machine server. Further to this, the machine server may encrypt some access information broadcasted specific to potential users of certain detected cell(s) of the cellular network(s). This may be provided based e.g. on a public land mobile network identity (PLMN ID) or Cell ID.

In an embodiment, advertisement configuration information of the machine server 4 may be provided to suitable mobile devices by the cellular network(s) 2 in order to facilitate the device(s) to discover the machine server 4. This can be provided e.g. via broadcast/multicast services of the cellular system.

In accordance with a possibility devices capable and suitable for D2M communications of interest, when being in the proximity of a machine server 4, may discover the machine server. The machine server can appear as an available access point name (APN) for possible selection in the device. The device can receive broadcast information of the machine type device and evaluate itself against selection criteria it is configured to follow. The information can be used to identify the machine type device. The information may comprise a unique number and/or address of the machine type device.

A possibility is to have just a number and/or address of the M-device posted on the M-device or on a wall or otherwise close thereof, either in a readable format or e.g. as a graphical presentation (e.g. barcode or similar). User of the mobile device may then manually initiate a service request by dialing the given number or inputting the address, or based on a reading of the graphical presentation. Thus, no D2M connection or access may be required at the beginning to request for the service. Thus, instead of a device based discovery of a machine server and initiation of a service request directly to a machine type device, service request procedure can be handled via the cellular system serving the mobile device. An advantage of this is that a mobile device does not have to reveal any identity information to the machine type device over the air interface when accessing it.

In accordance with an embodiment, if a mobile device 5 is in idle state and the latest cell it selected to camp in is different from that indicated in the received barring-related information of the machine server then the device can be triggered to at least receive and update local cell information or reselect a new (suitable) cell to camp in order to request the service.

In accordance with a possibility the mobile device can be adapted to decide whether to request for a service directly from a M-device or from a cellular system. The decision may be made based on e.g. pre-configurations that are hard-coded or received and updated from the cellular system, available details of the discovery information about M-device (this may include services and how-to-access-the-services information), information received from M-device via a D2M interface or inserted manually, read from e.g. a bar code or other graphical presentation by an appropriate reader and so on.

A user of a mobile device, when in need of service from the machine server, can select the machine server to connect to over a specified D2M radio interface. Upon accessing the machine server for requesting service, the device 5 indicates an authentic ID assigned by the cellular or second network 2 and necessary capability to the machine server 4 and the first network 1 of the machine server.

In an embodiment, a device in idle state of a cellular network may indicate its permanent mobile numbers or current Paging ID, together with PLMN ID and Cell ID of the cell the device camps in.

A mobile device in an active state in a cellular network may also indicate its permanent mobile numbers or current Cell Radio Network Temporary Identifier (C-RNTI), together with PLMN ID and Cell ID of the cell it connects to.

In an embodiment, a device wanting to use services via the machine server indicates its software/firmware compatibility capability information to the machine server. This information can include operating system (OS) or mobile eco-system information.

A machine server 4 and/or control apparatus of the network serving the machine server may carry out the first-stage checking whether to continue or stop serving a mobile device right away based on information indicated by the device. For example, it can be verified that a device is from an authentic cellular network and has the right capability for the requested service. The first network can then contact the second or cellular network to authenticate and authorize the user of the device and/or the device, confirming its capability and, for example, capacity to pay for the services. In an embodiment, the first network may indicate to the second network at least one of the following: information about the device based on information received from the device including identity, local cell and capability information, information about requested service and charging related issues, information about machine service including identity, location, capability, security-access-allocation configuration, detected local cell of the second network and corresponding timing advance information. For the timing advance information, one example is that the machine type device may occasionally perform Random Access Channel (RACH) attempts towards the local detected cell(s) of the second network(s) in order to get updated timing advance information.

The second network can at this stage authenticate the first network and the machine server. The second network can then try to allocate the mobile device via a serving-cell candidate procedure in order to confirm the authentication and authorization of the device for the requested service. That is, in case the device is in idle state in the second network, the second network can page the device in a regular fashion for the above transactions. Other types of operations are also possible for this purpose. In an embodiment, in order to allow the device to make a quick access to the serving-cell candidate, the second network may check with the identified serving cell to allocate dedicated resources for the device right away and indicate that to the device via the first network and D2M link. The allocation may at least contain a dedicated random access channel (RACH) preamble for a quick initial access. Other information may also be provided, such as for example C-RNTI, provisioned timing advance information based on that indicated by the server, needed bearer service configuration so that the device can go into radio resource control (RRC) connected state right away without a need of performing RACH.

According to a possibility the device gets access to the second, cellular network and is authenticated and authorized for the requested service provided by the machine server and the first network. The second network may facilitate necessary application allowing for the user of the device to confirm to its home network on its willingness and capacity to pay for the requested service. In an embodiment, the cellular network, after authenticating and authorizing the device, configures the device with valid security-access-and-allocation configurations of the machine server and the first network (e.g. new security keys to be applied for the upcoming session between the device and the machine server resource allocation to access machine server), as received from the first network.

Mobile devices can communicate with the machine type server and the first network over D2M while staying connected to the second, cellular network for possible assistance. The first network and the second network may interact and ask each other to reconfigure or, in general, control and manage the device over either D2M or cellular-access radio interface in a secure and efficient fashion. The second network may get updated of security-access-and-allocation information from the first network and signals that to the device over the cellular air interface when necessary during the service.

In accordance with an embodiment a mobile device is configured to monitor and report on the D2M link and service quality (including success-failure) to the second network.

In accordance with an embodiment no sensitive data associated with a mobile device is maintained and permanently stored at a machine server. This feature can be provided to prevent any possible malicious use while e.g. printing from a machine type terminal. This can be realized with e.g. a temporal embedded encryption method applied for the data used by the machine terminal, e.g. when actually printing. Furthermore, upon completing of a service session the first network may send confirmation to the second network and the device that any user data associated with the session is deleted.

An arrangement of networking functions and procedures to facilitate secure cellular network 2 assisted D2M communications where a machine server 4 provides services for a capable mobile device 5 of the authentic mobile cellular network 2 over a specified D2M air interface 7 will be described below. A device 5 can discover a machine server 4 for possible D2M communications and initiates service request to the machine 4 via the cellular network 2 by calling a unique number assigned to the machine. The discovery may be based e.g. on the user seeing the machine physically and detecting a number assigned to the machine attached physically on the machine or nearby, or discover the identity of the machine over the air, e.g. from a pop-up message shown on the screen of the device. A listing of possible services that the machine can provide may also be displayed. Upon receiving the call request of the device the cellular network 2 can identify the address or number of the machine server 4 and contact network 1 to authenticate and authorize both the machine server and the device for the requested service and service charge. The networks interact and exchange necessary configuration information over the interface 9 there between to enable D2M communications over the specified radio interface 7.

In accordance with a possibility network 2 contacted first by the mobile device 5 may request the mobile device 5 to indicate its D2M related capability and software/firmware compatibility information including OS information.

In accordance with a possibility, the first contacted network 2 activates suitable D2M mode for the mobile device 5 and configures the device with necessary information to get quick access to the machine server 4 and to conduct the requested service. The configuration information may include different security keys and RNTIs to discover and access the machine server.

In accordance with a possibility, network 1 where the machine server 4 is connected to allocates, and if needed reactivates, the machine server 4 for the requested service. The network 1 may also inform the machine server about the mobile device. This information can include information on assigned RNTIs, software compatibility and/or capability information, and so on.

In accordance with a possibility, the machine server 4 is configured to advertise at least some system information and some or all access information over the D2M interface 7. This can be provided in a secure encrypted fashion so as to ensure that only devices which are authenticated and authorized devices are able to acquire up-to-date valid ciphering key from the network 2. The machine 4 may broadcast information such as its identity, system information, service information, and/or access information to potentials devices.

Mobile device 5 can use the D2M configuration information received from the cellular network 2 to get access to and requested services in D2M mode. During D2M communications session, the cellular network 2 and the machine network 1 may interact and ask each other to reconfigure or, in general, control and manage the device over either D2M or cellular-access radio interface in a secure and efficient fashion.

When a D2M connection is provided in a cellular system assisted mode where a connection with the cellular system is maintained for the duration of the service it is possible to recover from a D2M link failure via the regular cellular access. Thus, if the mobile device can be kept in the connected state (DRX or long-sleep dormant) of cellular system until end of the service session. This can also be desired for example when charging takes place is via cellular network billing.

However, the connected state can also be dropped before the end of the service usage. The length of stay ion connected mode can depend on e.g. service type, capacity to pay and charging option that a user has selected. In the printing example, if a user is able to choose to pay by cash at the M-device site it can be enough for the cellular network to assist in setting up and/or enabling the use and then drop the connections.

The mobile device may be kept in RRC connected state with advance Discontinuous Reception (DRX) of the cellular network 2. This may be advantageous e.g. when other cellular access services are used in parallel. The mobile device can also be moved to RRC idle or long-sleep dormant state but still maintain some active user equipment (UE) contexts in the cellular network.

In accordance with a possibility, in order to allow the device 5 to be in RRC idle or long-sleep dormant state during a D2M session to enable a quick access or resynchronization to the serving cell of the cellular network when needed, the cellular network 2 may check with the serving cell to allocate dedicated resources for the device right away and indicate that to the device via the other network 1 and the D2M link 7. The allocation may contain a dedicated RACH preamble for a quick initial access. Information such as a new C-RNTI and/or provisioned timing advance information may be provided. The information can be based on history context information stored in the network regarding the mobile device or other mobile devices currently accessing the same machine type device. The information may also be based on information provided by a machine type device, as such a machine may occasionally perform RACH attempts towards the local detected cell(s) of the cellular network(s) in order to get updated timing advance information. Also, information such as needed bearer service configuration so that the device can go into RRC connected state right away without a need of performing RACH may be provided.

A mobile device, when being in either RRC idle or waking up from a long DRX state and having some uplink data to send to a cellular network 2, may send RRC connection request or scheduling request to the cellular network 2 via the ongoing D2M connection and another network 1, instead of performing RACH to re-establish the connection and get access to the cellular network 2 in a regular fashion. The cellular network 2 can, in response to the request of the device initially configure and assign dedicated resources for the device right away via the other network 1 as described above.

In accordance with a possibility, a device in RRC idle state during a D2M session may use the D2M interface 7 and network 1 to transmit data to the cellular network without going to RRC active state. This may be particularly useful for small data transmission. For example, this may be used for D2M link status reports and other reports and acknowledgements.

A mobile device may be configured to monitor and report various events, for example in relation to the D2M link and service quality. This reporting may include information on success-failure of D2M session and so on. The device may also indicate ending of the service to the cellular network. A proper ending of a D2M session may be important e.g. in a use cases where accurate charging and/or security is required. The end report can be used e.g. to confirm final charges and to ensure that no sensitive user data associated with the mobile device is left stored at the machine server.

The service provided via a M-device may be of once-off a kind.

A mobile device may be charged differently, for example based on a cash or credit card transaction at the M-site or by e-bill via the serving cellular network.

It may be desired to provide the user with a confirmation on charging of the service provided. This can be provided e.g. via a text message or another message, either via the cellular system or directly from the M-device. This can be especially desirable in cases where abnormal or failure event causes service interruption during the D2M service session. Such a confirmation may be wanted for example if a mobile device sends to a M-device for printing an album of 100 pictures and the M-device stops at the 60th pictures due to a reason or another. In another example, user may download a large video file, a music album, a game or a software package from a M-device and for some reason the service cannot be completed resulting in useless download, at least in part.

In accordance with a scenario the M-device can be provided by a SIM-less device. In some other scenarios the M-device is provided with a SIM to enable it to connect to a machine server or another system serving it serving via a cellular network. This connecting network can be same or different from the network serving the M-device.

Identifying information received from a mobile device can be used as such in the exchange of information between the systems. According to a possibility the information used by exchange is not the same as the identifying information in the request message from mobile device. For example, the cellular system may keep a mapping table between an identifier seen by the mobile device and an identifier for use in communications with the other system.

In general, the various embodiments may be implemented in hardware or special purpose circuits, software, logic or any combination thereof. Some aspects of the invention may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. The software may be stored on such physical media as memory chips, or memory blocks implemented within the processor, magnetic media such as hard disk or floppy disks, and optical media such as for example DVD and the data variants thereof, CD.

It is noted that whilst certain embodiments have been described in relation to 3GPP LTE, similar principles can be applied to any other communication arrangement where cellular assisted D2M communications may be desired. The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims. Indeed there is a further embodiment comprising a combination of one or more of any of the other embodiments previously discussed.

The invention claimed is:

1. A method in a wireless system, comprising:
   transmitting, by a machine type device via a device-to-machine connection, information relating to the machine type device and/or a service offered by the machine type device;
   receiving, by the machine type device from a mobile device, a request for authorization to receive the service provided by the machine type device, the request including information of an identity of the mobile device assigned by a cellular system,
   contacting, by the machine type device, the cellular system to authenticate and/or authorise the mobile device, the contacting causing the mobile device to have an access facility to the cellular system,
   receiving, by the machine type device, authentication and/or authorisation from the cellular system, and
   enabling, by the machine type device, communications for the mobile device to access the service from the machine type device via the device-to-machine connection when the mobile device is connected to the cellular system.

2. A method as claimed in claim 1, further comprising maintaining an access facility for the mobile device for at least the duration of use of the service and/or maintaining the mobile device in a radio resource control idle state where context information is maintained in the cellular system or radio resource control connected state with advance discontinuous reception while the mobile device communicates via the device-to-machine connection.

3. A method as claimed in claim 1, further comprising communicating, via the device-to-machine connection, at least one of
   a radio resource control connection or scheduling request to the cellular system,
   information regarding dedicated resources allocated by the cellular system to the mobile device, and
   data to the cellular system when the mobile device is in radio resource control idle state.

4. A method as claimed in claim 1, further comprising providing a part of information for accessing the machine type device by the cellular system and a second part of the information for accessing the machine type device by the machine type device.

5. A method as claimed in claim 1, comprising receiving, by the machine type device from the mobile device via the device-to-machine connection while the mobile device is in idle state with respect to the cellular system and then reporting to the cellular system, information relating to the device-to-machine connection and/or termination of the device-to-machine connection.

6. A method as claimed in claim 1, further comprising providing information of the machine type device by means of at least one of
   an air interface between the machine type device and the mobile device,
   an air interface between a station of the cellular system and the mobile device, and
   an advertisement visible at the location of the machine type device.

7. A method as claimed in claim 1, further comprising authenticating and authorising the machine type device and the mobile device between a second communication system or a server in a second communication system and the cellular system for a service requested by the mobile device.

8. A method as claimed in claim 1, further comprising communicating at least one of capability and/or compatibility information of the mobile device, cell identity, a radio network temporary identifier, a public landline mobile network identity, a permanent mobile number, current paging identity, information on security keys, barring information, system information, information on a requested service, information relating to charging, information relating to the location of the machine type device, end of the device-to-machine connection, deletion of data associated with the mobile device.

9. A method as claimed in claim 1, further comprising deleting data associated with the mobile device from the machine type device and/or an entity serving the machine type device in response to termination of the device-to-machine connection.

10. A method as claimed in claim 1, further comprising serving by the machine type device only mobile devices capable of camping in predefined one or more cells of the cellular system.

11. A method as claimed in claim 1, further comprising selecting by the mobile device whether to request for the service from the machine type device or from the cellular system.

12. An apparatus for enabling use of services, the apparatus comprising at least one processor, and at least one memory including computer program code, wherein the at least one memory and the computer program code are configured, with the at least one processor, to:
   transmit, by a machine type device via a device-to-machine connection, information relating to the machine type device and/or a service offered by the machine type device;
   receive, by the machine type device from a mobile device, a request for the service provided by the machine type device, the request including information of an identity of the mobile device assigned by a cellular system,
   contact, by the machine type device, the cellular system to authenticate and/or authorise the mobile device, the contacting causing the mobile device to have an access facility to the cellular system,
   receive, by the machine type device, authentication and/or authorisation from the cellular system, and
   enable communications for the mobile device to access the service from the machine type device via the device-to-machine connection when the mobile device is connected to the cellular system.

13. The apparatus of claim 12, wherein the apparatus is further caused to: maintain an access facility for the mobile device for at least the duration of use of the service and/or maintaining the mobile device in a radio resource control idle state where context information is maintained in the cellular system or radio resource control connected state with advance discontinuous reception while the mobile device communicates via the device-to-machine connection.

14. The apparatus of claim 12, wherein the apparatus is further caused to: communicate, via the device-to-machine connection, at least one of
   a radio resource control connection or scheduling request to the cellular system,
   information regarding dedicated resources allocated by the cellular system to the mobile device, and
   data to the cellular system when the mobile device is in radio resource control idle state.

15. The apparatus of claim 12, wherein the apparatus is further caused to: provide a part of information for accessing the machine type device by the cellular system and a second part of the information for accessing the machine type device by the machine type device.

16. The apparatus of claim 12, wherein the apparatus is further caused to: receive, by the machine type device from the mobile device via the device-to-machine connection while the mobile device is in idle state with respect to the cellular system and then report to the cellular system, information relating to the device-to-machine connection and/or termination of the device-to-machine connection.

17. The apparatus of claim 12, wherein the apparatus is further caused to: provide information of the machine type device by means of at least one of
   an air interface between the machine type device and the mobile device,
   an air interface between a station of the cellular system and the mobile device, and
   an advertisement visible at the location of the machine type device.

18. The apparatus of claim 12, wherein the apparatus is further caused to: authenticate and authorise the machine type device and the mobile device between a second communication system or a server in a second communication system and the cellular system for a service requested by the mobile device.

19. The apparatus of claim 12, wherein the apparatus is further caused to: communicate at least one of capability and/or compatibility information of the mobile device, cell identity, a radio network temporary identifier, a public landline mobile network identity, a permanent mobile number, current paging identity, information on security keys, barring information, system information, information on a requested service, information relating to charging, information relating to the location of the machine type device, end of the device-to-machine connection, deletion of data associated with the mobile device.

20. The apparatus of claim 12, wherein the apparatus is further caused to: delete data associated with the mobile device from the machine type device and/or an entity serving the machine type device in response to termination of the device-to-machine connection.

21. The apparatus of claim 12, wherein the apparatus is further caused to: serve by the machine type device only mobile devices capable of camping in predefined one or more cells of the cellular system.

22. The apparatus of claim 12, wherein the apparatus is further caused to: select by the mobile device whether to request for the service from the machine type device or from the cellular network.

* * * * *